(12) United States Patent
Wykman et al.

(10) Patent No.: US 9,702,377 B2
(45) Date of Patent: Jul. 11, 2017

(54) MOTOR AND PUMP ASSEMBLY FOR MOUNTING IN A VEHICLE SEAT

(75) Inventors: Tomas Wykman, Jönköping (SE); Bengt Hermansson, Mullsjö (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 960 days.

(21) Appl. No.: 13/996,823

(22) PCT Filed: Dec. 23, 2010

(86) PCT No.: PCT/EP2010/070689
§ 371 (c)(1),
(2), (4) Date: Aug. 6, 2013

(87) PCT Pub. No.: WO2012/084059
PCT Pub. Date: Jun. 28, 2012

(65) Prior Publication Data
US 2013/0343926 A1    Dec. 26, 2013

(51) Int. Cl.
*F04D 25/06*    (2006.01)
*F04D 29/66*    (2006.01)
(Continued)

(52) U.S. Cl.
CPC ......... *F04D 29/668* (2013.01); *B60N 2/4415* (2013.01); *B60N 2/5621* (2013.01); *F04D 25/06* (2013.01); *F04D 29/661* (2013.01)

(58) Field of Classification Search
CPC F04B 39/0027; F04B 39/0044; F04B 29/127; F16F 15/06; F16F 15/067; F16F 15/08
See application file for complete search history.

(56) References Cited

U.S. PATENT DOCUMENTS 2,722,047 A    11/1955  Cousino
2,928,589 A     3/1960  Devey
(Continued)

FOREIGN PATENT DOCUMENTS

DE    41 07 049 A1    9/1992
DE    44 38 752 A1    5/1996

OTHER PUBLICATIONS

English language abstract and machine-assisted translation for DE 4107049 extracted from espacenet.com on Jul. 29, 2013, 6 pages.
(Continued)

*Primary Examiner* — Patrick Hamo
(74) *Attorney, Agent, or Firm* — Howard & Howard Attorneys PLLC

(57) ABSTRACT

The invention relates to a motor and pump assembly for mounting in a vehicle seat including a motor driven pump unit (3), a housing (9, 11) and a suspension arrangement for holding the motor driven pump unit within the housing, said motor driven pump unit having a longitudinal axis, characterized in that the suspension arrangement comprises: at least one helical compression spring (8) for holding said motor driven pump unit and balancing its weight, one end of the helical compression spring being connected to the housing and the other end being connected to the motor driven pump unit, at least one spiral spring (1), the inner end of which being connected to one axial end of the motor driven pump unit and an outer end portion of which being connected to the housing, wherein the spiral spring is located such that the spiral is centered around the longitudinal axis of the motor driven pump unit (3).

10 Claims, 7 Drawing Sheets

Figure 1:
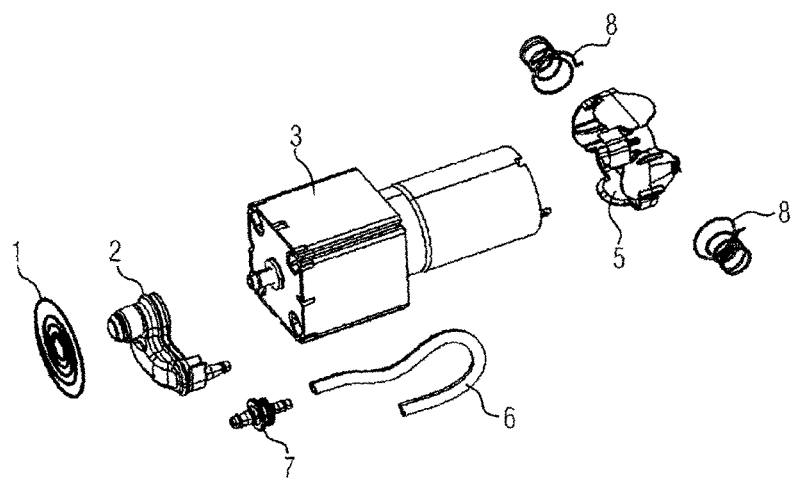

(51) Int. Cl.
*B60N 2/44* (2006.01)
*B60N 2/56* (2006.01)

(56) References Cited

U.S. PATENT DOCUMENTS

| | | | | |
|---|---|---|---|---|
| 2,929,552 A | * | 3/1960 | McGregor | F25B 31/02 310/51 |
| 3,187,995 A | * | 6/1965 | Kjeldsen | F04B 39/121 417/363 |
| 3,215,343 A | * | 11/1965 | Gannaway | F25B 31/02 267/180 |
| 3,578,279 A | * | 5/1971 | Scheldorf | F16F 15/067 248/624 |
| 4,184,810 A | | 1/1980 | Andersen et al. | |
| 4,406,592 A | * | 9/1983 | Kropiwnicki | F04B 39/127 248/560 |
| 4,427,349 A | * | 1/1984 | Elson | F25B 31/02 417/363 |
| 5,308,224 A | | 5/1994 | Oliver | |
| 5,639,228 A | | 6/1997 | Van De Venne | |
| 5,711,652 A | | 1/1998 | Van De Venne | |
| 6,543,741 B1 | * | 4/2003 | Li | F04B 39/0044 248/638 |
| 8,678,782 B2 | * | 3/2014 | Williams | F04B 35/045 417/363 |
| 2004/0156730 A1 | * | 8/2004 | Lilie | F04B 35/045 417/363 |
| 2009/0202373 A1 | * | 8/2009 | Williams | F04B 35/045 417/437 |
| 2014/0234137 A1 | * | 8/2014 | Roman | F04B 35/045 417/363 |

OTHER PUBLICATIONS

English language abstract and machine-assisted translation for DE 4438752 extracted from espacenet.com on Jul. 29, 2013, 5 pages.
International Search Report for Application PCT/EP2010/070689 dated Jul. 19, 2011, 4 pages.

* cited by examiner

MOTOR AND PUMP ASSEMBLY FOR MOUNTING IN A VEHICLE SEAT

The subject patent application claims priority to and all the benefits of International Patent Application No. PCT/EP2010/070689, filed on Dec. 23, 2010. The disclosure of International Patent Application No. PCT/EP2010/070689 is incorporated herein by reference in its entirety.

The present invention relates to a motor and pump assembly for mounting in a vehicle seat including a motor driven pump unit, a housing and a suspension arrangement for holding the motor driven pump unit within the housing, said motor driven pump unit having a longitudinal axis.

Motor driven pump assemblies are used today in the automotive industry also for applications in vehicle seats e.g. to provide particular ventilation functions. Other applications in vehicle seats are for seat support functions such as pneumatic air cells used to support the lumbar region, to provide side bolsters or massage functions.

For such applications the problem of noise generation and undesired vibrations had been previously addressed by providing foam or rubber structures to at least partially enclose the motor driven pump unit and to provide noise insulation. Examples of such constructions with elastic rubber and foam suspension means can be found in DE 44 38 752 A1, DE 41 07 049 A1, U.S. Pat. No. 5,711,652 and U.S. Pat. No. 5,639,228.

One problem associated with such designs is that the elastic rubber or foam materials tend to age with time which will reduce the capability for noise and vibration dampening. An additional problem is that the vibration dampening achieved is rather limited.

For application outside of the automotive industry constructions are known in which vibrating or rotating devices are held in spring suspension arrangements within a housing or a frame. Examples of such designs can be found in U.S. Pat. No. 2,928,589, U.S. Pat. No. 2,722,047 and U.S. Pat. No. 5,308,224.

One problem associated with such designs is that the spring suspension arrangement does not absorb the rotational or wobbling movement of the suspended device which is caused by movements of the components within the pump and the motor. For this reason sufficient extra space must be provided in such suspension arrangements to allow such wobbling or rotational movements of the suspended device which makes the design ineffective in view of space consumption.

Further, the known designs are only suitable for applications in which the frame or housing in which the device is suspended is stationary, i.e. is not subject to accelerations. On the other hand, when a motor driven pump is to be mounted in a moveable object such as a vehicle it is often subject to acceleration forces originating from an acceleration or deacceleration of the vehicle or originating from the vehicle travelling over an uneven surface. These accelerations, in particular those originating from bumpy roads, can be substantial. If a motor driven pump provided in a vehicle would be suspended using any of the above-mentioned prior art spring arrangements for stationary applications, the motor driven pump would move around and collide with surrounding structures.

It is an object of the present invention to provide a motor and pump assembly for mounting in a vehicle seat which allows a safe suspension of the motor driven pump unit without deteriorating performance over time. It is an additional object of the present invention to provide a motor and pump assembly which is of compact size, i.e. which does not require to provide extra spaces for possible movements of the motor and pump unit due to accelerations of the motor and pump assembly.

These objects are achieved by the motor and pump assembly comprising the features of claim 1. Preferred embodiments are set out in the dependent claims.

According to the present invention the suspension arrangement for the motor driven pump unit comprises at least one helical compression spring for holding said motor driven pump unit and balancing its weight within the housing. One end of the helical compression spring is connected to the housing and the other end is connected to the motor driven pump unit. In addition, there is at least one spiral spring, the inner end of the spring being connected to one axial end of the motor driven pump unit, wherein the spiral spring is located such that the spiral is centred around the longitudinal axis of the motor driven pump unit, with the plane of the spiral perpendicular to the longitudinal axis. The inner end of the spiral spring is thus connected to the motor driven pump unit at a position through which the longitudinal axis passes. An outer end portion of the spiral spring is connected to the housing. A spiral spring in the sense of the present application is having windings with no substantial pitch, although it is not necessary that the windings form a spiral in a mathematically strict sense lying in a plane. The function of the spiral spring is to provide a bias return force for any displacement of the motor driven pump unit in radial direction of the spiral spring.

In this arrangement the at least one helical compression spring supports the weight of the motor driven pump unit and absorbs forces caused by accelerations of the motor and pump assembly. The additional spiral spring around the longitudinal axis of the motor driven pump unit serves to absorb wobbling or oscillating rotational movements of the motor driven pump unit, i.e. rotational movements of the motor driven pump unit around its center of gravity or jerking movement around its longitudinal axis. With this arrangement accelerations and wobbling movements of the motor driven pump unit can effectively be absorbed without any substantial deterioration of the dampening capabilities of the suspension over the life time of the device. In addition, the spring characteristics of the springs can be chosen such that the expected range of accelerations in the intended application in a vehicle seat can be accommodated by the suspension arrangement with a given limited movement of the motor driven pump unit within the housing. This allows to design the housing in a space efficient manner, i.e. the extra space to allow movements of the motor driven pump unit following accelerations in the expected range can be predetermined and be rather limited.

In a preferred embodiment the at least one helical compression spring is connected to the motor driven pump unit at a location along the longitudinal axis thereof that corresponds to the axial location of the centre of gravity of the motor driven pump unit. In this way the motor driven pump unit is held balanced without additional suspension means needed to keep the balanced state.

In a preferred embodiment the motor and pump assembly is arranged such that, when it is oriented as in its mounted position in a vehicle seat, the at least one helical compression spring is located in vertical orientation below the motor and pump unit, with an extension of the spring axis passing through the centre of gravity of the motor driven pump unit. In a preferred form of this embodiment the motor and pump assembly is arranged such that, when it is oriented as in its mounted position in a vehicle seat, a second helical compression spring is located in vertical orientation above the motor driven pump unit and is with one end connected to the housing and with the other end to the motor driven pump unit. The second helical compression spring is located such that its longitudinal spring axis lies on a straight line extension of the longitudinal spring axis of the first helical compression spring below the motor driven pump unit. The second helical compression spring further stabilizes the suspension of the motor driven pump unit within the housing. In a preferred embodiment of this arrangement both helical compression springs are in a compressed or pre-loaded state, i.e. both exert a force against the motor driven pump unit, which spring forces together with the gravitational force on the motor driven pump unit add to a zero net force in the absence of accelerations. These counter-acting compression springs improve a stable suspension, and furthermore reduce or limit the movement range of the motor driven pump unit following accelerations of the assembly. In addition, this embodiment reduces the risk that any spring(s) could be dislodged from its connection to the motor driven pump unit or to the housing.

In an alternative embodiment two helical compression springs are provided which are, when the motor and pump assembly is oriented as in its mounted position within a vehicle seat, disposed essentially horizontally. The two helical compression springs are mounted symmetrically to the motor driven pump unit in this case, each of the helical compression springs being connected at one of its ends to the motor driven pump unit and to a housing wall at its other end. Also in this case the two helical compression springs are disposed such that they are connected to the motor and pump unit at a position along the longitudinal axis thereof which corresponds to the centre of gravity of the motor driven pump unit.

Also in the afore-mentioned arrangement it is preferred that the compression springs are in a compressed or pre-loaded state in order to improve the stability of the arrangement.

In a preferred embodiment a mounting collar is provided which is fitted on to and surrounding the motor driven pump unit at a location along its longitudinal direction corresponding to its centre of gravity, which mounting collar is arranged with mounting means on its outer surface to receive and retain an end portion of the helical compression spring(s). This embodiment allows to choose from different arrangements of the compression spring arrangement, for example the vertical and horizontal arrangement as mentioned above, by providing different variants of the mounting collar adapted to the particular spring configurations and selecting the one desired, whereas the remaining components (such as housing and motor driven pump unit) could be the same for different configurations or orientations of springs.

In a preferred embodiment the motor and pump assembly is arranged such that the longitudinal axis of the motor driven pump unit is extending in a horizontal direction and transverse to a longitudinal axis of the vehicle, when the motor and pump assembly is oriented as in its mounted position within the vehicle seat.

In a preferred embodiment a flexible air tube is extending from the outlet of the pump of the motor driven pump unit and is guided in a loop to an exit opening of the housing. Due to the flexibility of the tube and its path in a loop with extra length to the exit it can follow movements of the motor driven pump unit within the housing due to accelerations, while avoiding any risks that the tube or the components connected thereto comes under tension or strain due to movements of the motor driven pump unit.

In a preferred embodiment elastic cushioning element are provided between a wall of the housing and the motor driven pump unit inside or surrounding each of the helical compression springs to limit and dampen movements of the motor driven pump unit towards the housing walls in case of excessive accelerations. Preferably, the elastic cushioning elements are positioned and dimensioned such that they prevent further movement of the motor driven pump unit beyond a point where any of the springs reaches a critical compression or extension state, wherein this critical compression and extension states of the springs include states of compression or extensions where the springs would be damaged, cause noise or would be at risk of becoming dislodged from the connection to the housing or to the motor driven pump unit.

Figure 2A:
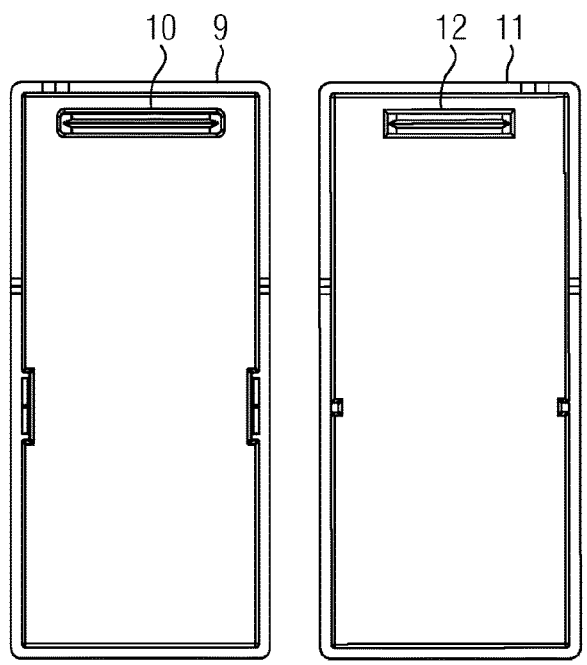
Figure 2B:
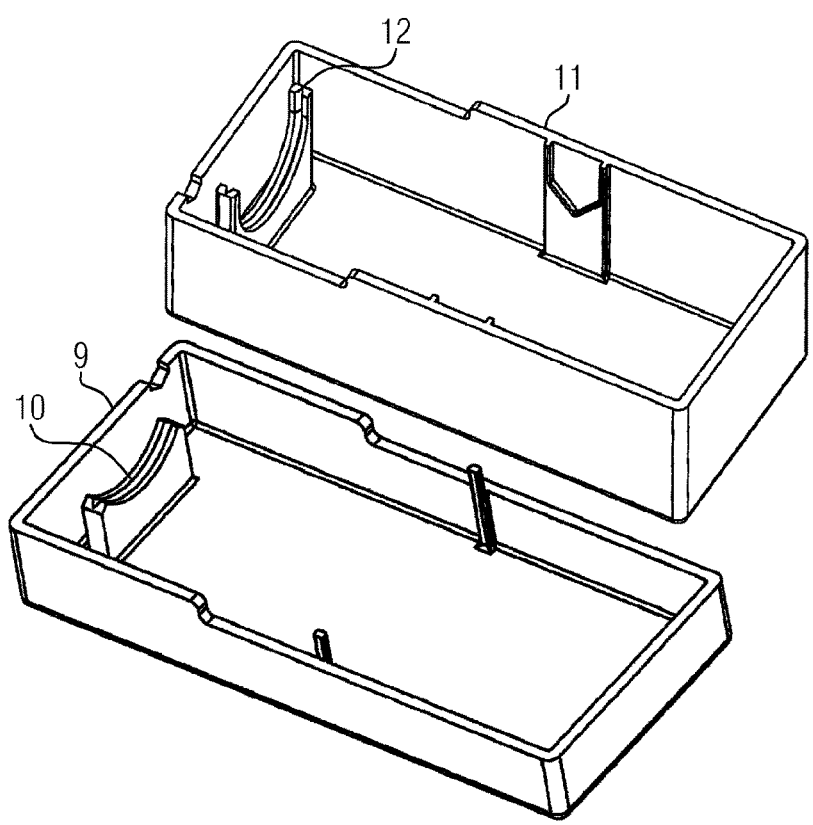
Figure 2C:
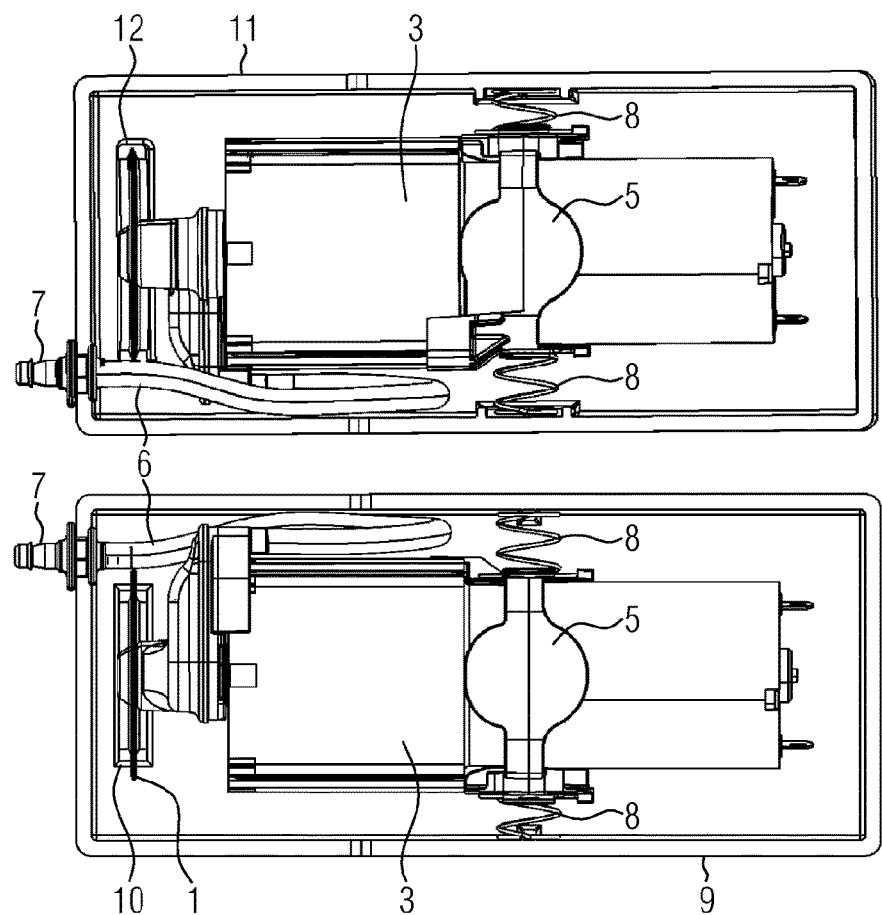
Figure 3:
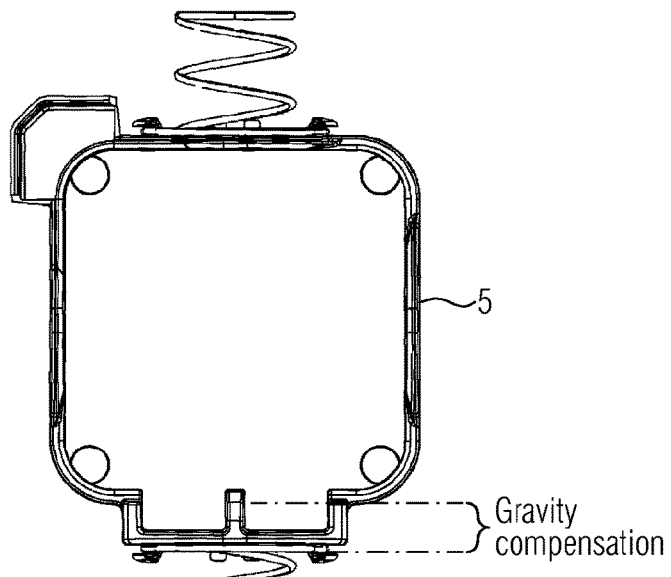
Figure 4:
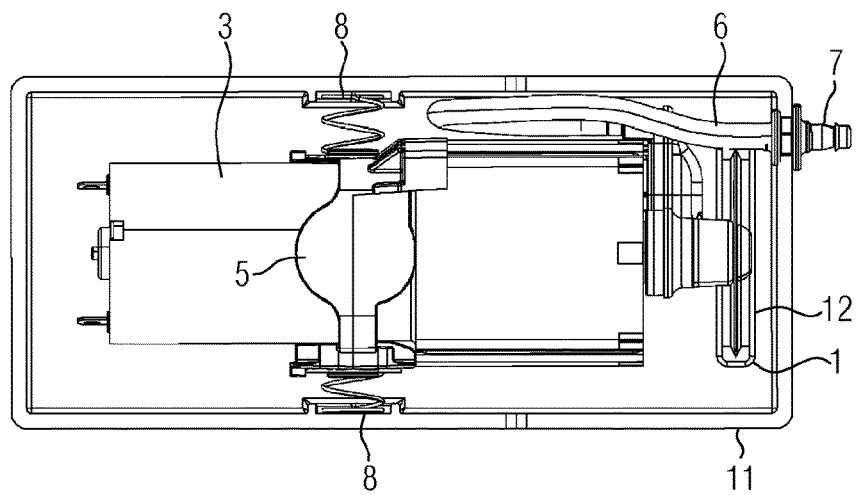
Figure 5:
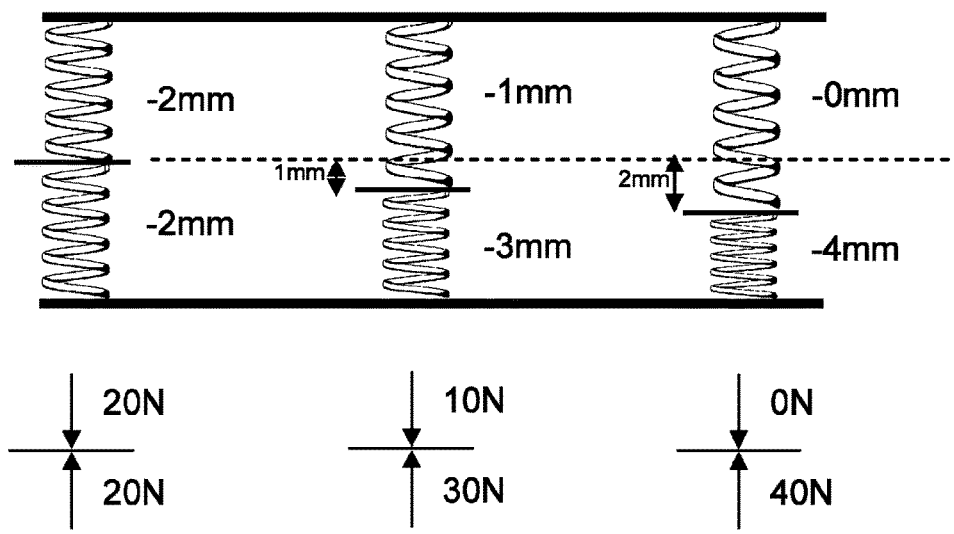
Figure 6:
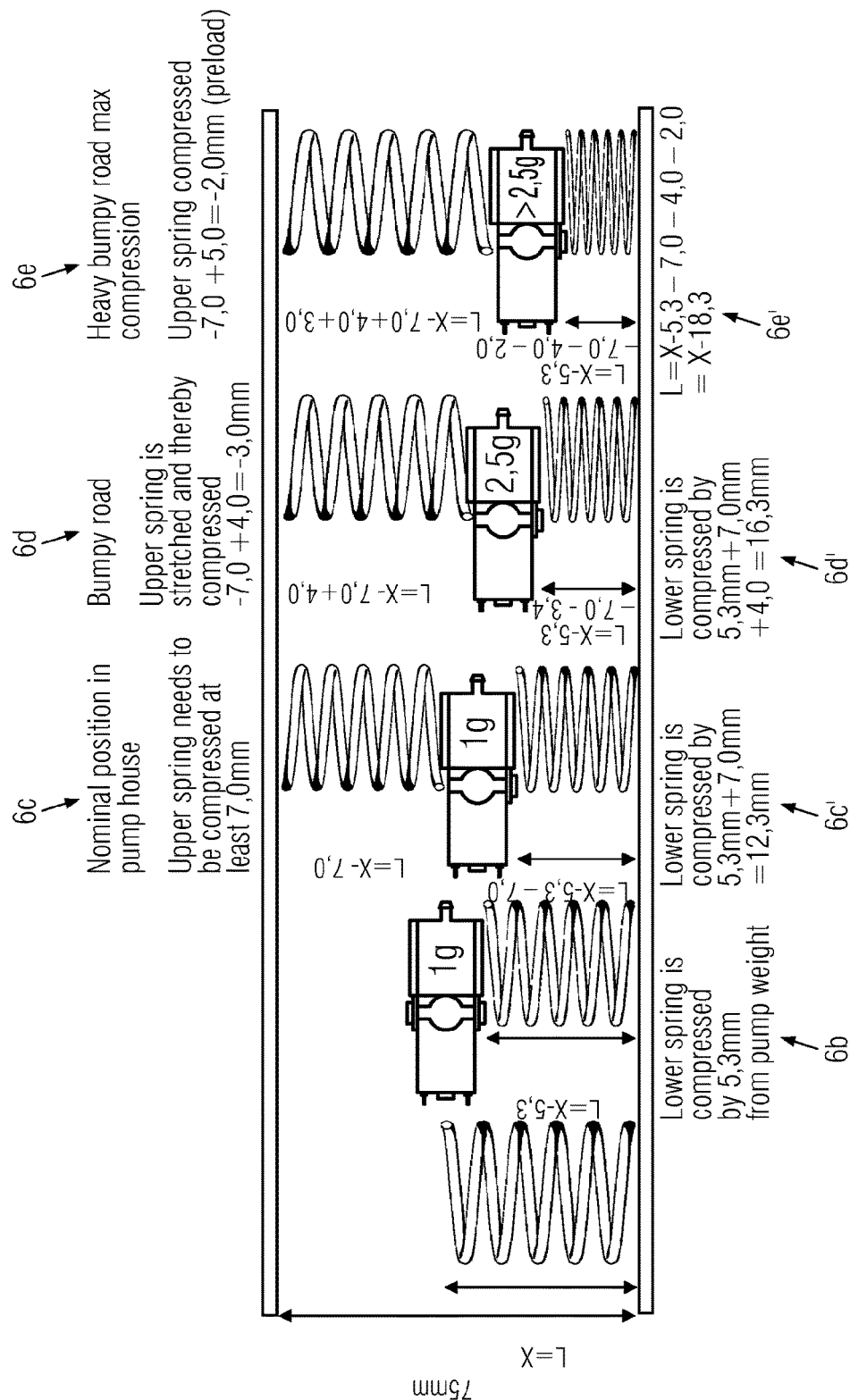
Figure 7:
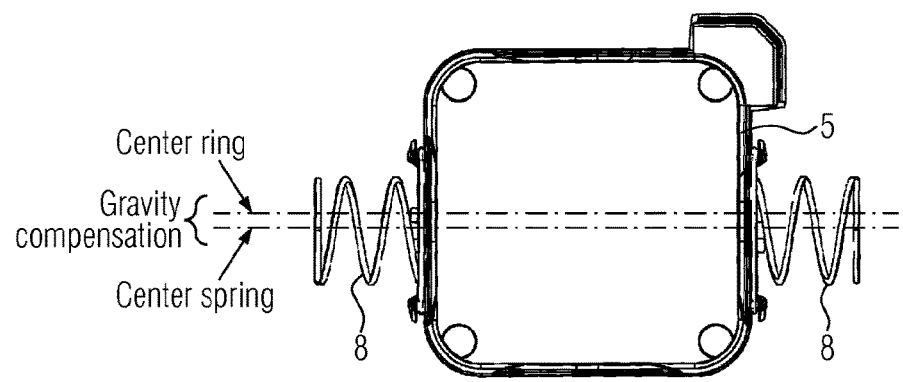
Figure 8:
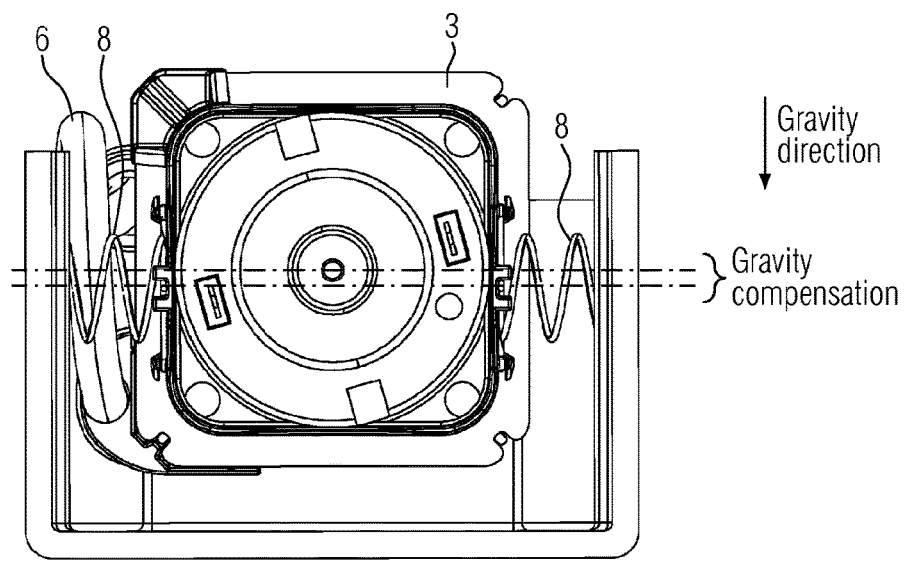

The invention will in the following be described in connection with preferred embodiments shown in the drawings in which:

FIG. 1 shows an exploded view of some of the components of the motor and pump assembly, FIG. 2 a-c shows plan views and perspective views of the housing members as well as a plan view of a motor driven pump unit held within one of the housing parts, FIG. 3 shows an end view of the motor driven pump unit suspended by helical compression springs according to a first embodiment, FIG. 4 shows a side view of the motor and pump assembly being suspended in the housing according to the first embodiment, FIG. 5 shows a schematical diagram to illustrate the dynamical behaviour of a helical compression spring suspension corresponding to the first embodiment, FIG. 6 shows a schematical diagram to further illustrate the behaviour of the helical compression spring suspension in different states, FIG. 7 shows an end view of the motor driven pump unit suspended by helical compression springs according to a second embodiment, and FIG. 8 shows an end view of the motor and pump assembly being suspended in the housing according to the second embodiment.

FIG. 1 shows a number of basic components of the motor and pump assembly. A motor driven pump unit 3 has an electric motor and a pump. The motor driven pump unit 3 has a longitudinal axis which extends through the centre line of the cubic part and the centre line of the cylindrical part of the unit.

A mounting collar 5 may have an essentially square shape (see FIGS. 3 and 7) and may be made of elastic material. The mounting collar 5 is dimensioned such that is closely fits around the intended portion of the motor driven pump unit 3 with a certain elastic deformation of the collar such that it tightly fits around the motor driven pump unit 3. Such arrangement of a quadratic, or more generally polygonal, collar which is elastically deformed when fitted onto the intended portion of the motor driven pump unit is capable of absorbing manufacturing tolerances which are adsorbed by the elastic deformation of the mounting collar when fitted onto the motor driven pump unit.

The mounting collar 5 is arranged to be fitted on the cylindrical part of the motor driven pump unit 3 in such a manner that its location along the longitudinal axis is centred on the centre of gravity of the motor driven pump unit 3. The mounting collar 5 is further provided with mounting means which allow to connect the end portions of helical compression springs 8 to the mounting collar 5. Such mounting means may for example be circular projections with outwardly directed hook portions at its outer end so that a loop or winding of the helical spring may be wound around the circular projection and be retained there by the hook portions.

A distributor 2 is mounted at one end of the pump to conduct the pumped air to a spigot 7 through a flexible air tube 6. At the same end portion as the distributor 2 a spiral spring 1 is mounted such that it is centred on the longitudinal axis of the motor driven pump unit 3. The inner end of the spiral spring 1 is thus connected to the motor driven pump unit 3 on the longitudinal axis on said pump unit, whereas an outer end portion of the spiral spring 1 is connected to a surrounding housing.

FIGS. 2a and b shows in the upper part an embodiment for a housing of the motor driven pump unit. There are two housing members 9 and 11 which may be stacked together to form a housing that has the general form of a cuboid. Close to one of their ends the housing members 9 and 11 are provided with annular mounting members 10 and 12. These annular mounting members 10, 12 are provided with an annular groove adapted to receive an outer end portion of the spiral spring 1 to be fixed therein.

In FIG. 2c the motor driven pump unit 3 is shown as received and held within the housing members 9.

Two helical compression springs 8 are connected to the mounting collar 5 surrounding the motor driven pump unit 3. At their outer ends these helical compression springs are connected to the housing. In this embodiment the helical compression springs are in vertical orientation, i.e. one compression spring 8 is located below the motor driven pump unit 3 and one of them above the motor driven pump unit in the mounting position of the motor and pump assembly in the vehicle seat. In this arrangement one of the helical compression springs 8 carries the weight of the motor driven pump unit 3 (the lower helical compression spring 8 in the view of FIG. 2c), whereas the other compression spring located above the motor driven pump unit 3 further stabilizes the suspension of the motor driven pump unit 3. If only one helical compression spring is located below the motor driven pump unit 3 and one of them above, it is advantageous that they are located such that their longitudinal spiral axes are pointing to the centre of gravity of the motor driven pump unit 3, or in other words it is advantageous that they are connected to the motor driven pump unit 3 at a location along the longitudinal axis thereof which corresponds to the location of the centre of gravity along this direction, because in such configuration the weight force of the motor driven pump unit is not accompanied by a torque.

In principle there could also be more than only one helical compression spring for supporting the motor driven pump unit 3. If there would be two identical helical compression springs for supporting the motor driven pump unit 3 from below they would be located at symmetric positions along the longitudinal direction of the motor driven pump unit with respect to its centre of gravity, i.e. in the same distance thereto, but in different directions.

The spiral spring 1 is received and fixed in the annular groove of the angular mounting means 10 and 12. The spiral spring 1 is in this manner held such that its spiral centre is located on the longitudinal axis of the motor driven pump unit 3. The inner end of the spiral spring 1 is connected to the end portion of the motor driven pump unit 3.

FIGS. 3 and 4 illustrate a first embodiment of a motor and pump assembly having a suspension arrangement with two helical compression springs which are oriented vertically in the orientation of the assembly which corresponds to the intended mounted position within a vehicle seat. The lower compression spring 8 which supports mounting collar 5 and the motor driven pump unit (not shown in FIG. 3) from below is more compressed than the one located on top the motor drive pump unit because the weight force of the motor driven pump unit 3 acts as additional force on the lower compression spring. Both compression springs 8 are still in a compressed state, i.e. their lengths in the axial direction of the spring axis is lower than their lengths in a released state.

FIG. 5 is a schematically illustration to demonstrate the dynamical behaviour of a suspension with two vertically oriented compression springs as in the first embodiment. Please note that the motor driven pump unit has been omitted in this illustration and been replaced by a schematical plate in the middle between the two springs. For this example two springs were assumed, each having a spring constant of c=10 N/mm. In the situation on the left hand side both springs are compressed by 2 mm compared to their released state which corresponds to a force of 20 N for each of the counter-acting springs.

In the state shown in the middle of FIG. 5 the plate between the two springs has been moved down by 1 mm. The force required to achieve this movement of 1 mm corresponds to 20 N, since the upper spring is compressed by 1 mm from their released length and the lower spring is compressed by 3 mm compared to the released state, which means that the upper spring exerts a force of 10 N downwardly directed, whereas the lower spring exerts a force of 30 N in upwards direction, resulting in a net force of 20 N.

In the situation illustrated on the right hand side the plate between the springs has been moved down by 2 mm compared to the balanced state shown on the left hand side of FIG. 5. This corresponds to a force on the lower spring, which is now compressed by 4 mm, of 40 N. The upper spring is now elongated by mm which corresponds to its released state; therefore no force is created by the upper spring, and the total force to move the plate to the stage on the right hand side of FIG. 5 is 40 N.

From the above considerations it follows that the formula describing the force needed to displace an object which is subject to two identical counter-acting springs as shown in FIG. 5 is F=2·x·c, wherein x is the displacement distance and c is the spring constant of each of the two compression springs. This formula is valid when the two pressure springs are working against each other and within a range of displacements were the pressure force from each of the two springs is larger than zero.

In order to further determine the characteristics of the springs for a suspension according to the first embodiment an example is considered in which the motor driven pump unit has a weight of 0.5 kg. This corresponds to a weight force caused by the motor driven pump unit of about 4.9 N. The maximal acceleration on a bumpy road is estimated to be 2.5 g, i.e. under this acceleration the force acting on the motor driven pump unit is 2.5 times the initial weight force, i.e. the total force acting on the motor driven pump unit is now 2.5·4.9 N=12.3 N. The force difference (nominal to bumpy road) then is 12.3 N−4.9 N=7.4 N. If the design now allows for a maximum displacement of for example 4 mm, one can calculate the corresponding spring constant of each of the two helical compression springs by inserting the force of 7.4 N and a displacement of 4 mm in the above equation and solving it for the spring constant c from which c=0.93 N/mm follows.

The initial displacement from the weight of the motor driven pump unit is then 7.4 N/0.93 N/mm=5.3 mm. This is calculated under the assumption that the motor driven pump unit is first mounted on the lower spring only. Then the upper spring is added which is, for example, compressed by −14 mm. Since upper and lower springs have the same spring constant this compression is shared between the upper and lower spring so that the lower spring is compressed by −5.3–7.0 mm and the upper spring by −7 mm.

To further describe the spring characteristics in this embodiment we assume a clamping length of 14.0 mm (the clamping length is the length of the mounted spring in the compressed state but without weight force or any acceleration). Considering the displacement due to the weight force of 5.3 mm a length of the lower spring 14.0−5.3=8.7 mm results which is the length of the lower spring when the motor driven pump unit is at its nominal rest position (i.e. in the balanced state without acceleration).

If one then assumes an initial compression of the lower spring of 8.7 mm the total length X of the lower spring in the uncompressed state follows as 8.7 mm=X−5.3 mm−7.0 mm which corresponds to X=21 mm.

This situation is illustrated in FIG. 6, wherein again a spring constant of c=0.93 N/mm as assumed. The following legends are applied at the reference numerals in the particular situations illustrated in FIG. 6:

6*b*: Lower spring is compressed by 5.3 mm from pump weight;
6*c*: nominal position in pump house; upper spring needs to be compressed at least 7.0 mm
6*c'*: lower spring is compressed by 5.3+7.0 mm=12.3 mm
6*d*: bumpy road; upper spring is stretched and thereby compressed −7.0+4.0=−3.0 mm
6*d'*: lower spring is compressed by: 5.3+7.0+4.0=16.3 mm
6*e*: heavy bumpy road, maximum compression; upper spring compressed −7.0+5.0 mm=−2.0 mm (preload)
6*e'*: L=X−−5.3−7.0−4.0 mm=X−18.3 mm.

From 6*e'* it follows that the compression of the spring needs to be 18.3 mm at maximum external load. Considering the total length of 21 mm in the uncompressed state this means that the spring maximum solid length could be calculated to 21−18.3 mm=2.7 mm.

FIGS. 7 and 8 show a second embodiment for the spring suspension arrangement. In this embodiment two helical compression springs are provided which are oriented essentially horizontally in the orientation of the motor and pump assembly which corresponds to the orientation in the intended mounted position in a vehicle seat. In this arrangement the two counteracting compression springs are symmetrically disposed on both sides of the motor driven pump unit 3. In order to support the weight of the motor driven pump unit 3 the springs are slightly bent downwardly, i.e. from the outer end slightly bent downwardly to the inner end which is connected to the motor driven pump unit 3. If the horizontal springs are in a compressed state the force resisting further bending of the springs, resulting in a vertically upward directed force from the counter-acting springs, and the compression forces acting in the "bent" direction of the inner ends of the springs connected to the mounting collar, resulting in a vertically downwardly directed force, and the weight force must add to a zero net force in the equilibrium state in the absence of accelerations. This equilibrium state will automatically be reached at a certain bending of the horizontal springs. For example, when the motor driven pump unit in the second embodiment moves downward, e.g. due to the vehicle travelling over a bump in the road, the net force is positive and directed downwards. After the pump, when the acceleration is not as strong (for instance only gravitational acceleration) the motor driven pump unit will travel upwards, due to the net force being positive and directed upwards. The motor driven pump unit will travel to a point slightly above its stable equilibrium position, due to the inertia of the system. As this happens the force will again be directed downwards. After this, the motor driven pump unit will oscillate up and down with less and less travel/force unit it reaches the stable position in which the net force on the pump unit is zero again.

The helical compression springs in this horizontal arrangement can also be designed such that the spring suspension follows the relation F=2·x·c, with x being the vertical displacement of the motor driven pump unit. The springs have a larger diameter D at the outer ends facing away form the motor driven pump unit and a smaller diameter d at the opposite end. For the ratio of the diameter d at the outer end of the spring to the spring length L it is advantageous that d/L≥1. It is also advantageous if the maximum movement is d/2 or less, as this will also improve the resistance to twisting of the spring around the spring axis.

As shown in FIGS. 3 and 7 and 8 the mounting collar 5 may be arranged such that it provides "gravity compensation". This means that the longitudinal axis of the motor driven pump unit has a nominal or intended position within space in the housing. Due to its weight the motor driven pump unit 3 would by slightly shifted downward due to the compression or deformation of the springs carrying its weight. In order to ensure that the centre axis of a motor driven pump unit is nevertheless at its intended nominal position within space within the housing, in the embodiment of FIG. 3 the mounting collar 5 is provided with a vertical projection on which the motor driven pump unit rests. The vertical height of this projection corresponds to the compression caused by the weight of the motor driven pump unit which therefore is at its intended nominal position within the housing. In the embodiment of FIGS. 7 and 8 with horizontal springs such "gravity compensation" is provided by the position of the helical springs on the outer surface of the mounting collar 5, i.e. the compression springs are not attached to the mounting collar at its vertical middle or central axis but at a point slightly more downwardly so that the middle or centre axis of the mounting collar 5 is disposed vertically somewhat higher than the longitudinal axis of the helical compression springs. This shift is arranged such that the central axis of the mounting collar and therefore the central axis of the motor driven pump unit is at its nominal position although despite of a deformation of the compression springs due to the weight of the motor driven pump unit. This "gravity compensation" provided by the described embodiments of the mounting collar 5 is advantageous since it allows to choose from different spring configurations as described above while it is ensured that the motor driven pump unit remains at its designed nominal position within the housing by selecting a corresponding variant of the mounting collar.

The invention claimed is:

1. A motor and pump assembly for mounting in a vehicle seat including a motor driven pump unit, a housing and a suspension arrangement for holding the motor driven pump unit within the housing, said motor driven pump unit having opposing axial ends and a longitudinal axis extending through the axial ends, wherein the suspension arrangement comprises:

at least one helical compression spring for holding said motor driven pump unit and for balancing a weight of the motor driven pump unit, one end of the at least one helical compression spring being connected to the housing and an other end of the at least one helical compression spring being connected to the motor driven pump unit at a location along the longitudinal axis that corresponds to an axial location of a center of gravity of the motor driven pump unit, and at least one spiral spring having an inner end connected to one of the axial ends of the motor driven pump unit and an outer end portion connected to the housing with the opposing axial end of the motor driven pump unit remaining free from connection to the housing, wherein the at least one spiral spring is located such that the at least one spiral spring is centered around the longitudinal axis of the motor driven pump unit.

2. The motor and pump assembly according to claim 1, wherein the motor and pump assembly is arranged such that, when the motor and pump assembly is situated in its mounted position in the vehicle seat, the at least one helical compression spring is located in vertical orientation below the motor and pump unit with an extension of a spring axis of the at least one helical compression spring passing through the center of gravity of the motor driven pump unit.

3. The motor and pump assembly according to claim 2, wherein the motor and pump assembly is arranged, when the motor and pump assembly is mounted in its mounted position within the vehicle seat, such that a second helical compression spring is located in vertical orientation above the motor driven pump unit and has one end connected to the housing and an other end connected to the motor driven pump unit, wherein the second helical compression spring is disposed such that a spring axis of the second helical compression spring lies on a straight line extension of a spring axis of a first helical compression spring below the motor driven pump unit.

4. The motor and pump assembly according to claim 1, wherein two helical compression springs are provided which are disposed horizontally, when the motor and pump assembly is oriented in its mounted position within the vehicle seat, each of the helical compression springs connecting one side of the motor and pump unit with a housing wall, wherein the two helical compression springs are disposed such that they are connected to the motor driven pump unit at a position along the longitudinal axis which corresponds to the center of gravity of the motor driven pump unit, wherein the two helical compression springs are connected to the motor and pump unit in a vertical position below the center of gravity of the motor driven pump unit.

5. The motor and pump assembly according to claim 3, wherein each of the helical compression springs is in a compressed state disposed between one housing wall and one side of the motor driven pump unit.

6. The motor and pump assembly according to claim 1, wherein the at least one helical compression spring is attached to the motor and pump unit by a mounting collar fitted onto the motor and pump unit which is provided with one or more mounting means for attaching an end portion of the at least one helical compression spring.

7. The motor and pump assembly according to claim 1, wherein the motor and pump assembly is arranged such that the longitudinal axis of the motor driven pump unit extends in a horizontal direction and transverse to a longitudinal axis of a vehicle when the motor and pump assembly is oriented as in a mounted position within the vehicle seat.

8. The motor and pump assembly according to claim 1, wherein a flexible air tube extends from an outlet of a pump of the motor driven pump unit and is routed in a loop to an opening of the housing.

9. The motor and pump arrangement according to claim 1, wherein elastic cushioning elements are provided between a wall of the housing and the motor driven pump unit inside or surrounding each of the at least one helical compression spring to limit movements of the motor driven pump unit towards a housing wall in case of excessive accelerations.

10. The motor and pump assembly according to claim 4, wherein each of the helical compression springs is in a compressed state disposed between one of the housing walls and one side of the motor driven pump unit.

* * * * *